United States Patent
Baskett

[15] 3,637,024
[45] Jan. 25, 1972

[54] TRACTOR MOUNTED, GROUND-RAKING AND ROCK-GATHERING APPARATUS

[72] Inventor: Theodore N. Baskett, 9514 Portland Ave., Tacoma, Wash. 98445

[22] Filed: May 14, 1970

[21] Appl. No.: 37,244

[52] U.S. Cl. ...................................... 171/63, 171/94, 37/8
[51] Int. Cl. ........................................................ A01b 43/00
[58] Field of Search .................. 171/63, 94, 91, 124, 126; 37/8, 126 AC, 129

[56] References Cited

UNITED STATES PATENTS

| | | | |
|---|---|---|---|
| 3,208,165 | 9/1965 | Johnson et al. | 37/8 |
| 3,274,711 | 9/1966 | Johnson et al. | 37/8 |
| 3,210,868 | 10/1965 | Liess | 37/8 |
| 2,732,672 | 1/1956 | Fleischman | 171/63 |
| 2,220,398 | 11/1940 | Dreikosen | 171/94 |
| 3,335,888 | 8/1967 | Kugler | 37/8 |

*Primary Examiner*—Antonio F. Guida
*Attorney*—Eugene D. Farley

[57] ABSTRACT

Ground-raking and rock-gathering apparatus comprises an attachment for a tractor having a forwardly located, material-handling bucket, i.e., a "front end loader." The attachment includes a rotatably mounted endless, flexible support having mounted thereon a plurality of raking teeth. Pivotal mounting means mount one end of the support on the bucket with the support extending forwardly of the bucket in upper and lower runs. The lower run is arranged to deliver to the bucket solid objects gathered by the teeth. Drive means are connected to the support for driving it in a rotational direction predetermined to move the lower run in the direction of the bucket. Elevating means are connected to the support for moving it angularly about the pivotal mounting means between raised and lowered positions.

10 Claims, 7 Drawing Figures

THEODORE N. BASKETT
INVENTOR.

BY Eugene D. Farley
ATTY.

TRACTOR MOUNTED, GROUND-RAKING AND ROCK-GATHERING APPARATUS

This invention relates to tractor-mounted ground-raking and rock-gathering apparatus. It pertains particularly to ground-raking and rock-gathering apparatus for attachment to the buckets of front end loader-type tractors.

In the construction and agricultural industries, there exists a need for a versatile apparatus which rapidly will rake the ground, collect rocks and other debris and transport it to a disposal location. It is the general purpose of the present invention to provide such an apparatus having in addition the following objects and advantages:

It is easily and detachably mountable on conventional tractors of the front end loader type without extensive modification thereof.

It operates efficiently in conditioning the ground and raking solid debris into the bucket of the tractor.

When changing locations or when emptying the bucket, it may be hoisted out of the way, whereupon the tractor and bucket operate in their normal fashion.

It works rapidly, operating speeds of 60 lineal feet per minute easily being obtainable.

It is versatile in its application to the removal of debris of various categories including rocks, brush, pieces of wood and metal, etc.

It is versatile in its application to terrain of different grades and conditions.

It is operable on both wet and dry ground.

The raking teeth with which it is provided are sturdy and not excessively subject to damage. However, when damaged, they may easily be removed and replaced individually without disassembly of the entire attachment.

It is provided with a floating suspension which enables it to accommodate ground irregularities without damage to the apparatus.

It is relatively simple in construction, inexpensive to manufacture and easily attached to and detached from conventional tractors of the front end loader type.

The manner in which the foregoing and other objects of this invention are accomplished will be apparent from the accompanying specification and claims considered together with the drawings wherein:

Figure 1:
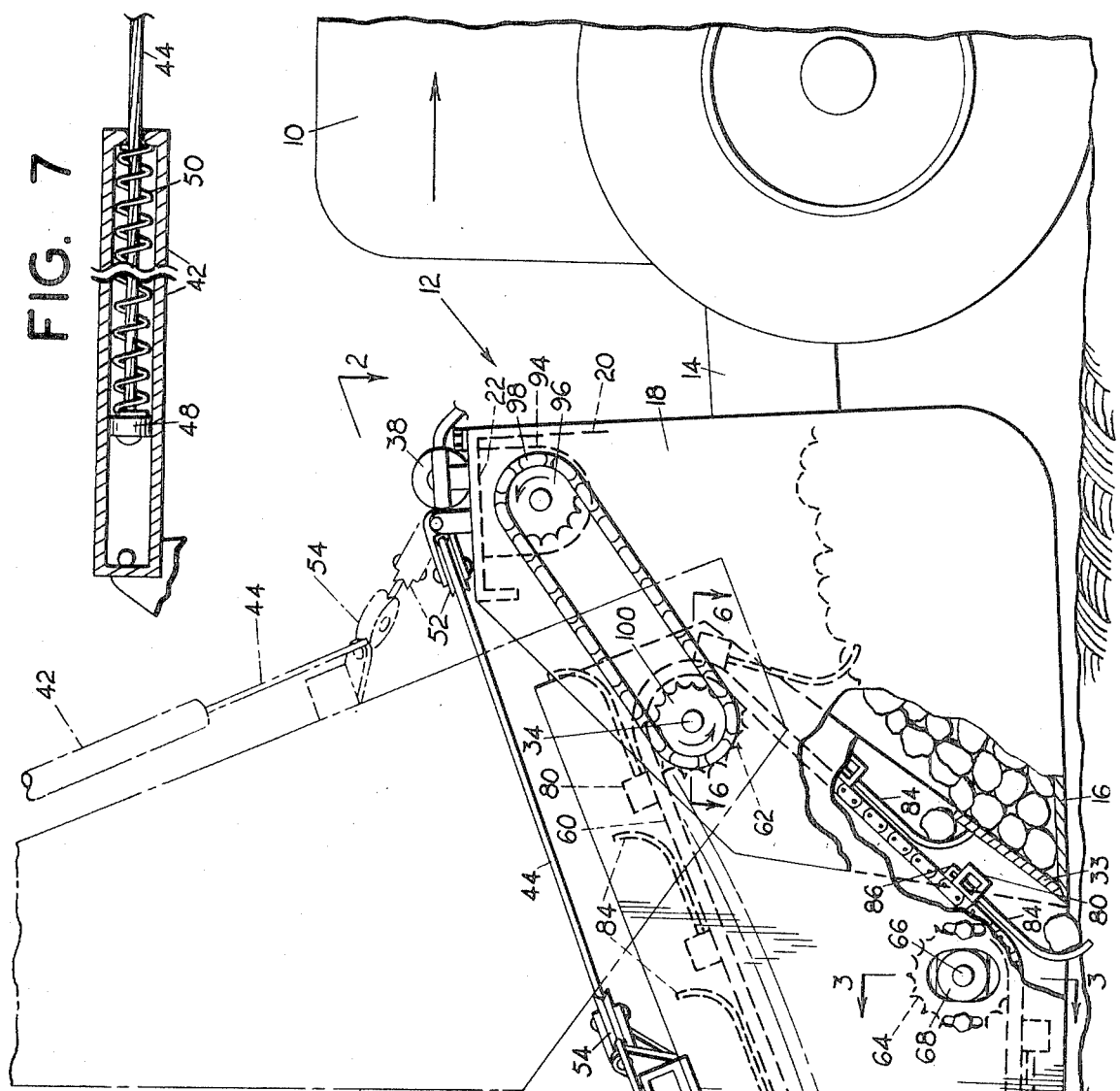
FIG. 1 is a view in side elevation of the herein described tractor mounted ground-raking and rock-gathering apparatus, partly broken away to show interior construction.
Figure 2:
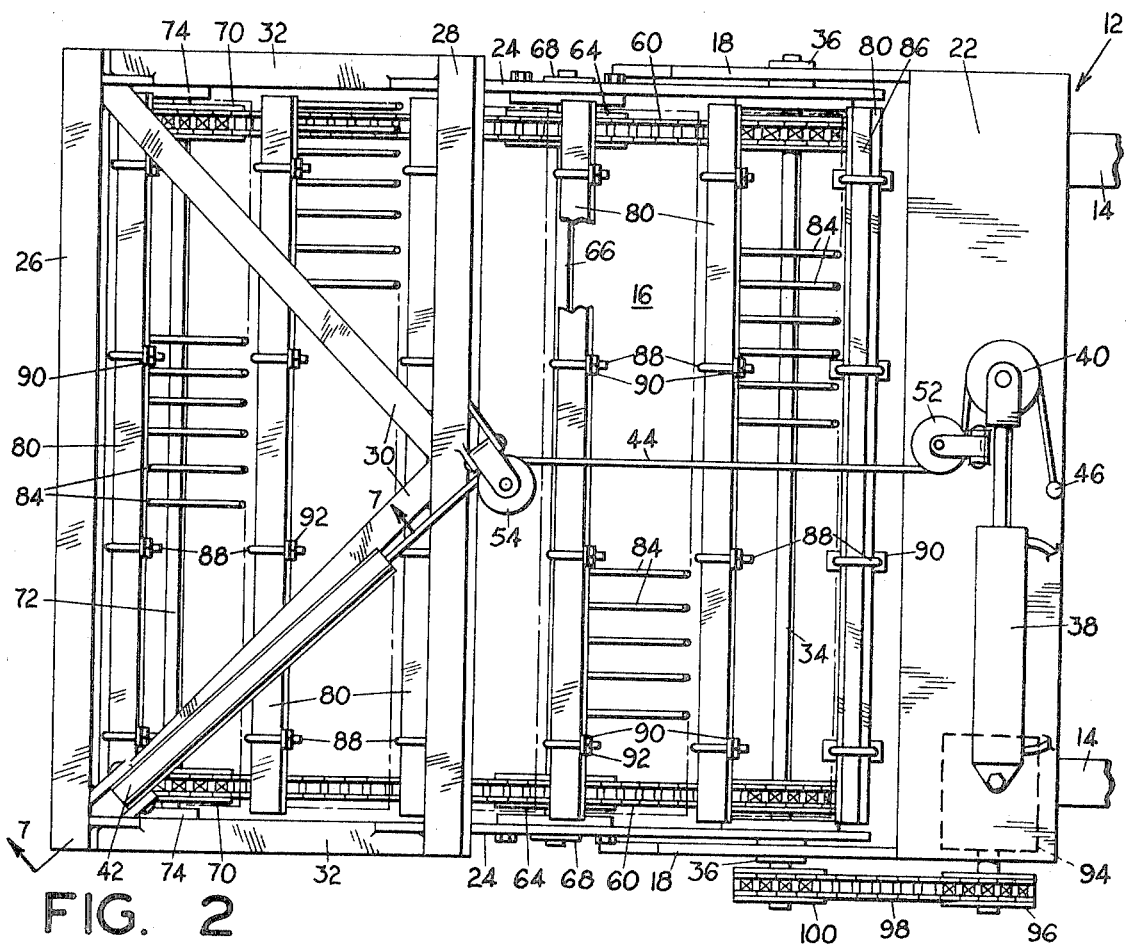
FIG. 2 is a plan view looking in the direction of line 2—2 of FIG. 1.
Figure 3:
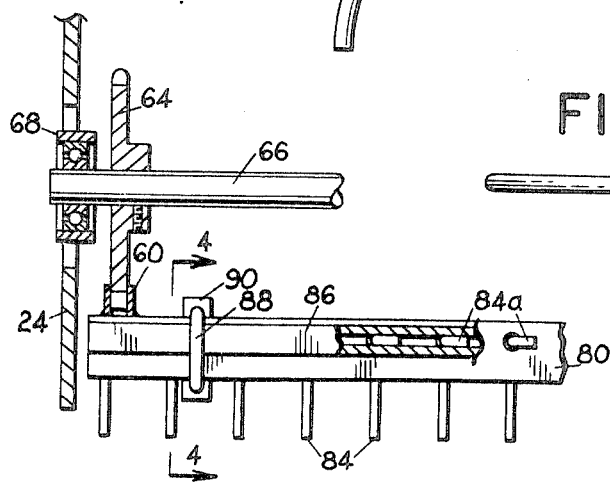
Figure 4:
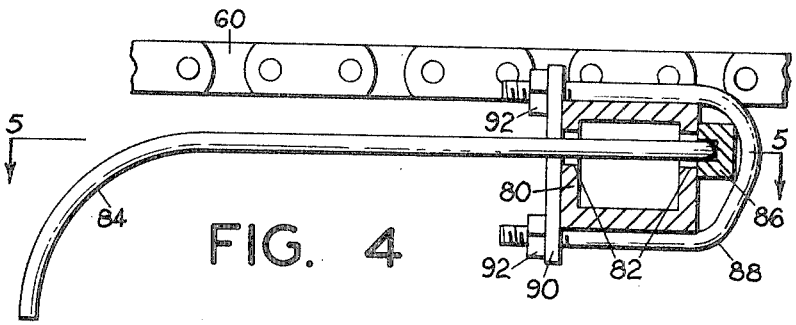
Figure 5:
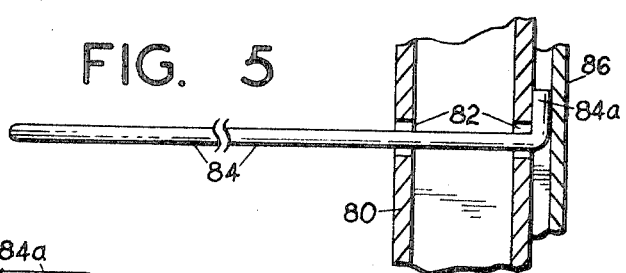

FIGS. 3, 4, 5, 6 and 7 are fragmentary detail sectional views taking along lines 3—3 of FIG. 1, 4—4 of FIG. 3, 5—5 of FIG. 4, 6—6 of FIG. 1 and 7—7 of FIG. 2, respectively.

In its broad aspect, the tractor mounted ground-raking and rock-gathering apparatus of my invention comprises a rotatably mounted endless structural support having mounted thereon a plurality of raking teeth. The pivotal mounting means mount one end of the support on the material-handling bucket of a conventional front end loader or other tractor. The support is mounted in such a manner that it extends forwardly of the bucket in upper and lower runs, with the lower run arranged to deliver to the bucket solid objects gathered by the teeth.

Drive means are connected to the support for driving it in a rotational direction predetermined to move the lower run in the direction of the bucket. Elevating means are connected to the support for moving it angularly about the mounting means between lowered and raised positions.

When the support is lowered into contact with the ground and the drive started, the teeth rake the ground, gather the rocks and other debris and move it into the bucket. When the operation has been completed, or the bucket filled, the support is elevated. Thereupon the tractor may be operated in a normal manner, to carry the debris to the disposal site.

Considering the foregoing in greater detail and with particular reference to the drawings:

As shown in FIG. 1, the herein described ground-raking and rock-gathering apparatus is mounted on a tractor 10 provided with a material-handling bucket 12. The latter is mounted in the usual manner on arms 14 and is provided with a bottom 16, a pair of sideplates 18, a backplate 20 and a partial top plate 22. The usual means, not illustrated, is applied to the bucket for raising, lowering and tilting it as required to execute its usual functions.

The herein described attachment provides means for conditioning the ground in front of the bucket and for transferring rocks and other debris to the interior of the bucket for transportation to the disposal site.

The attachment is mounted on a frame, comprising a pair of vertical, parallel, horizontally spaced sideplates 24, a pair of transverse crosspieces 26, 28, a pair of diagonal braces 30, and a pair of longitudinal connecting bars 32 FIG. 2.

A rearwardly inclined, combination guide plate and retaining plate 33 is mounted between sideplates 24 at their inner lower extremities.

One end of the frame thus constituted is pivotally connected across and within the sidewalls 18 of bucket 12 by means of a combination mounting and drive shaft 34. As shown in FIG. 6, this shaft penetrates both sidewalls 18 of the bucket and support plates 24. It is journaled in bearings 36 mounted on the latter.

Means are provided for raising and lowering the frame angularly about shaft 34.

As shown also in FIGS. 1 and 2 such means comprise a fluid-operated cylinder, preferably an hydraulic cylinder 38. The case of the cylinder is mounted on top plate 22 of the bucket. The piston rod of the cylinder mounts a pulley 40.

One end of a spring-loaded, cushioning cylinder 42 is pivotally attached to frame members 26, 32.

One end of a cable 44 is pinned to top plate 22 by pin 46. The other end of cable 44 is connected to a piston 48 which works against spring 50 in a spring-loaded, cushioning cylinder 42, FIG. 7.

The cable is reeved about pulley 40 and also about suitably positioned guide pulleys 52, 54. Extension and retraction of the piston of drive cylinder 38 accordingly raises and lowers the frame between the dotted line and full line positions of FIG. 1.

In its lowered position, the frame is maintained at the proper height resiliently by the action of spring-loaded, cushioning cylinder 42. This prevents damage to the assembly in the event of collision with rocks, roots, projecting pipes, concrete abutments, and the like.

Rotatably mounted on the frame is an endless flexible support for the raking teeth.

The support for the teeth basically comprises a pair of parallel, endless chains 60. These engage sprockets 62 fixed to shaft 34 in sideplates 36. They also mesh with guide sprockets 64 fixed to a shaft 66 journaled in vertically adjustable bearings 68 mounted on plates 24, FIG. 3; and with sprockets 70 fixed to shaft 72 journaled in horizontally adjustable bearings 74, mounted also in plates 24, FIG. 1.

It is to be observed that mounting the chains in this manner provides upper and lower runs. The lower run is divided in two segments: a horizontal, forwardly extending segment which is substantially parallel to and in close proximity to the ground; and an upwardly inclined, rearwardly located segment which runs inside the bucket. This results in a characteristic three-point suspension of the assembly and makes possible raking the ground, gathering the rocks and other debris and transferring the latter into the bucket.

Chains 60 mount a plurality of crossbars 80 which in turn mount the raking teeth. The crossbars are welded to links of the chain in the manner shown in FIGS. 4 and 5.

Each crossbar preferably comprises a hollow, box-shaped member having transversely therethrough a plurality of pairs of aligned, horizontally arranged openings 82. These are dimensioned to receive teeth 84.

The outer ends of teeth 84 are arcuately shaped. Their inner ends are provided with angularly bent shanks 84a. The teeth thus may be inserted in openings 82 by inserting the arcuate ends, and pushing them entirely through until the bent shank ends 84a lie flush against the rearward surfaces of the crossbars.

Clamp means are provided for releasably clamping the teeth in position, while still permitting their removal as required for repair of replacement.

To this end there is provided a channel bar 86, the recess in which is dimensioned to receive shanks 84a of the teeth. The channel member is pressed tightly against the back surfaces of bars 80 and clamped thereto by a plurality of U-shaped clamps 88.

The latter have threaded ends which penetrate a perforated retaining plate 90. Nuts 92 then are employed to clamp the assembly together, demountably securing the teeth in their operative positions.

Drive means are provided for driving the endless flexible support and the teeth which it supports in a direction such that the lower run delivers to the bucket solid objects gathered by the teeth.

The drive includes a motor, preferably an hydraulic motor 94, the drive shaft of which mounts a sprocket 96. A chain 98 interconnects drive sprocket 96 with a companion sprocket 100 fixed to the end of shaft 34.

OPERATION

The operation of the herein described ground-raking and rock-gathering apparatus is as follows:

With the apparatus in the full line position of FIG. 1, tractor 10 is run backwardly while the drive for the endless flexible tooth support is operated to drive the lower stretch thereof in the direction of the tractor bucket. The assembly is maintained resiliently in working contact with the ground by operation of hoisting cylinder 38 and associated spring-loaded, cushioning cylinder 42.

Teeth 84 condition the ground and also transport rocks, cans, bottles, wood fragments and other debris into contact with retaining guide 33. The elevated segment of the lower run of the support then lifts the debris upwardly into bucket 12 where it is retained by support 33.

When the bucket is full, cylinder 38 is operated to elevate the raking attachment to the dotted line position of FIG. 1. The tractor and associated bucket 12 then are operated in the normal manner to transport the debris to the disposal site.

Where the terrain is rough, the cushioning effect of cylinder 42 prevents damage to the assembly. Where slopes are being processed, the assembly may be adjusted to a corresponding angle by the operation of cylinder 38. If it is desired to transport brush, the assembly is dropped on the brush and the latter dragged away by operation of the tractor. In the event teeth are damaged and must be replaced, they are easily removed and replaced by releasing yokes 88 and clamping bars 86.

In addition, all of the operations of the apparatus may be carried out rapidly on varied terrain, under wet and dry conditions.

Having thus described my invention in preferred embodiments, I claim as new and desire to protect by Letters Patent:

1. Ground-raking and rock-gathering apparatus comprising, in combination with a tractor having a material-handling bucket:
   a. a rotatably mounted, endless support having a plurality of laterally spaced raking teeth mounted thereon,
   b. pivotal mounting means mounting one end of the support on the bucket with the support arranged with a lower elongated run extending forwardly of the bucket substantially parallel to the ground for ground engagement of the teeth, a rearward elongated run extending angularly upward and rearward from the lower run into the bucket for delivery to the bucket of solid objects collected by the lower run, and an upper run extending between the upper end of the rearward run and forward end of the lower run,
   c. drive means connected to the support for driving it in a rotational direction predetermined to move the lower run in the direction of the bucket, and
   d. elevating means connected to the support for moving it angularly about the pivotal mounting means between the operative, ground-engaging position and an inoperative, raised position.

2. For use with a tractor having a material-handling bucket including a pair of spaced sidewalls, a ground-raking and rock-gathering attachment comprising:
   a. a rotatably mounted endless flexible support,
   b. a plurality of raking teeth,
   c. teeth mounting means mounting the teeth on the support,
   d. support mounting means pivotally mounting one end of the support between the sidewalls, the support being arranged with a lower elongated run extending forwardly of the bucket substantially parallel to the ground for ground engagement of the teeth, a rearward elongated run extending angularly upward and rearward from the lower run into the bucket for delivery to the bucket of solid objects collected by the lower run, and an upper run extending between the upper end of the rearward run and the forward end of the lower run, and
   e. drive means connected to the support for driving in a rotational direction predetermined to move the lower run in the direction of the bucket.

3. The attachment of claim 2 including elevating means connected to the support for moving it angularly about the pivotal mounting means between the operative, ground-engaging position and an elevated, inoperative position.

4. The attachment of claim 3 wherein the elevating means comprises a fluid-operated drive cylinder mounted on the bucket, spring-loaded, cushioning cylinder means connected to the support, and pulley and cable means interconnecting the drive cylinder and the cushioning cylinder, the cushioning cylinder being arranged to support the flexible support resiliently in said operative position.

5. The attachment of claim 2 wherein the support comprises a pair of sprocket-mounted, horizontally spaced, endless chains and a plurality of transverse, parallel spaced bars mounted across the chains and in turn mounting the raking teeth, the tooth mounting means comprising a plurality of openings through the bars, each opening receiving one of the teeth, and clamp means clamping the teeth to the bars.

6. The attachment of claim 2 wherein the support comprises a pair of sprocket-mounted, horizontally spaced, endless chains and a plurality of transverse, parallel spaced bars mounted across the chains and in turn mounting the raking teeth, wherein the teeth have angularly bent shank portions and the bars have openings therethrough, each of the openings receiving one of the teeth with the shank portion thereon lying along the exterior surface of its respective bar, and including channel-shaped plates receiving the shank portions of all of the teeth, and clamp means clamping the plates to the bars, thereby demountably mounting the teeth on the bars.

7. The attachment of claim 6 wherein the clamp means comprises threaded nut and yoke means.

8. The attachment of claim 2 wherein the support mounting means comprises a shaft rotatably mounted across the sidewalls of the bucket and the drive means comprises power means connected to the shaft.

9. The attachment of claim 2 wherein the support mounting means includes a pair of vertical, laterally spaced plates, one on each side of the support means, and guide means mounted between the plates is inclined upwardly and inwardly into the bucket from the lower front end thereof for guiding solid objects raked by the teeth into the bucket.

10. The attachment of claim 2 wherein the endless support is adjustable vertically relative to the ground in the area between the lower run and the rearward run.

* * * * *